Sept. 1, 1942.                L. F. STROUT                2,294,698
                              SWIVEL JOINT
                           Filed May 29, 1940
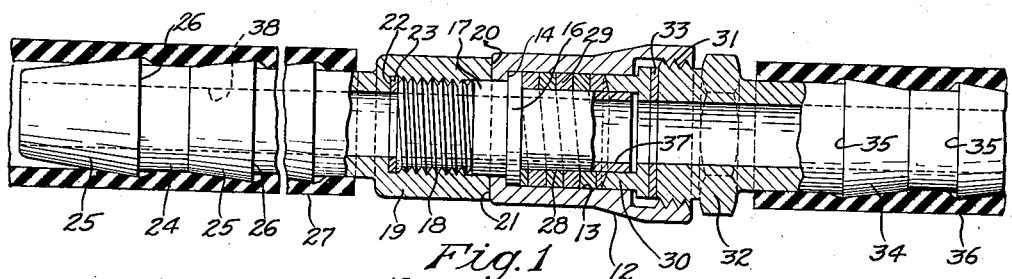
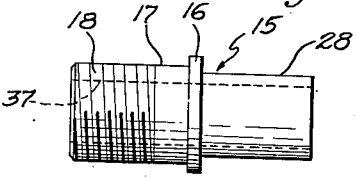   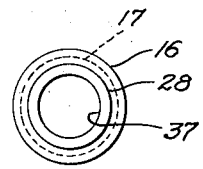
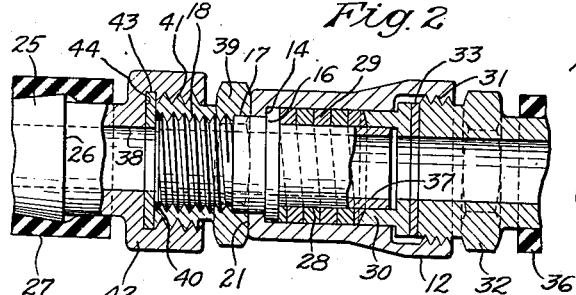   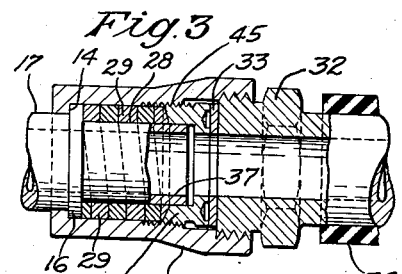
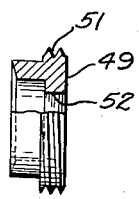   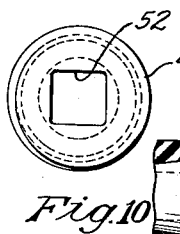   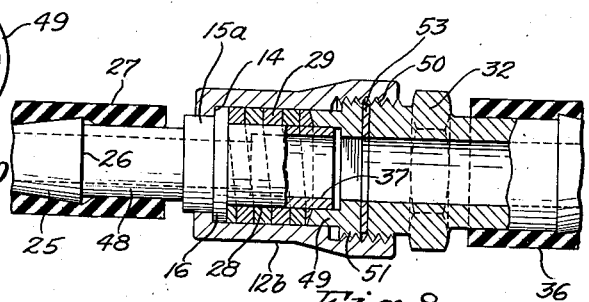
INVENTOR
Leeman F. Strout
BY
Wooster & Davis
ATTORNEYS Patented Sept. 1, 1942

2,294,698

UNITED STATES PATENT OFFICE 2,294,698

SWIVEL JOINT

Leeman F. Strout, Stamford, Conn.

Application May 29, 1940, Serial No. 337,751

1 Claim. (Cl. 285—97.8)

This invention relates to swivel joints, particularly for connecting the sections of hose, such for example as water hose, garden hose, air hose, or the like, to permit relative turning movement between the sections to prevent twisting or kinking, and has for an object to provide an improved and simplified construction which while permitting the connected lengths of hose to readily swivel will remain tight and non-leaking, and in which the full size passage through it may be maintained.

With the foregoing and other objects in view I have devised a construction illustrated in the accompanying drawing forming a part of this specification, but it is to be understood that I am not limited to the specific details shown, but may employ various changes and modifications within the scope of the invention.

In this drawing:

Fig. 1 is a longitudinal section through my improved swivel connection;

Fig. 2 is a side elevation of the internal sleeve employed therein;

Fig. 3 is an end view thereof;

Fig. 4 is a section similar to Fig. 1 showing a slight modification;

Fig. 5 is a similar view showing another slight modification;

Figs. 6 and 7 are a partial section and side elevation and an end view respectively of the follower used in Fig. 5;

Fig. 8 is a view similar to Figs. 1, 4 and 5 showing another slight modification;

Figs. 9 and 10 are a partial section and side elevation and end view respectively of the follower shown in Fig. 8; and Fig. 11 is a detail section showing how a ball bearing may be used to facilitate the relative turning movements.

Referring first to Fig. 1, the improved swivel joint comprises a body 12 having the internal passage 13 therethrough with an inwardly extending shoulder 14 adjacent one end thereof. Within this passage is a sleeve 15 having an external flange 16 thereon intermediate the ends of the sleeve. The external diameter of this flange is preferably the same as the diameter of the passage 13, and the flange is seated at one side against the shoulder 14. From this side of the flange portion 17 of the sleeve projects from the end of the body 12 and is provided with means for connecting a hose thereto. This may be an extension integral with the sleeve as indicated in Fig. 8. In the form shown in Figs. 1 and 4 the projecting end portion of the sleeve is threaded as indicated at 18 to receive the hose connection. In Fig. 1 this hose connection includes a socket 19 at one end internally threaded to receive the threaded end 18 of the sleeve, and the socket may be long enough so that its free end 20 may engage the end 21 of the body 12 to retain the flange 16 against the shoulder 14 and prevent longitudinal sliding movements of the sleeve. At the inner end of the threaded socket 19 may be a shoulder 22 to receive the packing ring 23 between this shoulder and the end of the sleeve to prevent leakage. The projecting portion 24 of the hose connection may have tapered portions 25 ending in shoulders 26 over which the end of the hose 27 may be slipped to connect the hose to the connection.

On the opposite side of the flange 16 sleeve 15 has a reduced cylindrical portion 28 which is of smaller diameter than the passage 13 of the body 12 to provide a space for a flexible packing 29. The inner end of the sleeve is embraced by a follower 30 of an external diameter substantially that of the passage 13 and an internal diameter to fit the portion 28 of the sleeve. This follower therefore forms a supporting bearing for the inner end of the sleeve to assist the flange 16 and the portion 17 in preventing rocking of the sleeve in the body and therefore always keeping the sleeve in proper alignment. The opposite end portion of the body 12 from the shoulder 14 and the projecting end portion 17 of the sleeve is threaded to receive a hose connection. It is preferably internally threaded as indicated at 31 to receive a standard male hose coupling 32, and when threaded into the body the inner end of this coupling presses against the end of the follower 30 to thus press the other end of the follower against the packing 29 to clamp the packing between the walls of the passage 13 and the portion 28 of the sleeve and also the flange 16, to make a tight joint and prevent leakage. A packing washer 33 may be inserted between the end of the hose coupling and the follower. This hose coupling also includes the tapered portions 34 ending in shoulders 35 over which the end of the hose 36 may be slid. It will be seen that with this construction the projecting end portion 17 of the sleeve has no packing around it and therefore sufficient metal stock may be provided to give the necessary thickness of wall to stand the strain of the hose connection without bending or breaking and still permit the use of an internal passage 37 therethrough equal in diameter to the passage 38 in the standard hose connection for a given size hose. This is not possible in any other hose connection of which I am aware. As there is no strain of the hose connection on the reduced portion 28 of the sleeve, the walls of this portion do not need to be as thick, and therefore its external diameter can be reduced sufficiently to give the necessary space for the packing 29 in a standard fixture.

The construction shown in Fig. 4 is the same as that of Figs. 1, 2 and 3 except a modified connection for the hose is provided. Here a separate nut 39 is threaded on to the threaded end 18 of the projecting portion 17 of the sleeve 15 and engages the end of the body 12 to retain the flange 16 against the shoulder 14, and it may be held in position by solder 40 on the end portion of the threads. This nut is externally threaded at 41 to receive the standard female hose connection 42. A packing washer 43 is ordinarily used between the end of the nut 39 and the shoulder 44 at the bottom of the socket in this hose connection.

In the modification shown in Fig. 5 the construction is the same as in the previous figures except that the body 12a corresponding to the body 12 of the first form is internally threaded as indicated at 45 and the follower 46 is externally threaded to engage therewith, the follower forming a supporting bearing for the inner end of the sleeve 15 the same as in the first form, and also pressing the packing 29 against the tube and flange as in the other form. The follower may be provided with means for turning it in the threads 45 so as to tighten it up on the packing or to remove it for renewing the packing, such for example as recesses 47 to receive a spanner wrench or other suitable tool. When the male hose coupling 32 is threaded into the body 12a it may press against the end of the follower the same as in the previous form, and a suitable packing ring or washer 33 may be placed between this end and the follower to prevent leakage, the same as in the first form.

In the form shown in Fig. 8 instead of having the end of the sleeve which projects from the casing threaded as shown at 18 in the first form, this sleeve 15a may be provided with an integral extension 48 provided with the tapered portions 25 and shoulders 26 for holding the hose 27. Otherwise the sleeve is the same, and has the external flange 16 engaging the shoulder 14 in the body 12b, and on the inner side of this flange is reduced at 28, the same as in the first form, where it is embraced by the packing 29. The inner end of this reduced portion is embraced by the follower 49 forming a supporting bearing for this inner end of the sleeve and also for tightening up the packing. In this case the end of the body 12b has an end socket internally threaded as shown at 50 to receive the male hose coupling 32. In this form the follower 49 has a flange externally threaded at 51 so as to be threaded into the threads 50. This follower may have means for rotating it such as the sockets 47 in the follower 46 for a spanner wrench, or it may have a non-circular opening 52 to receive a similarly shaped tool. The end of the coupling 32 may press against this follower as in the other forms either with or without a packing washer 53.

In the form shown in Figs. 5 and 8, should the joint leak around the packing 29 the coupling member 32 may be removed by unscrewing it and then the follower 46 or 49 tightened up by means of a suitable tool.

In the form shown in Figs. 1 and 4 the packing may be tightened by screwing the coupling member 32 further into the body 12.

In Fig. 11 there is shown a ball bearing 54 between the flange 16 and the shoulder 14 to reduce friction and permit more easy turning of the sleeve in the casing. This may be a simple thrust bearing comprising a retainer holding a series of balls running on the shoulder 14 and corresponding shoulder on the flange.

It will be seen that this joint is a very simple one which can be easily and quickly assembled and maintained tight at all times. As the sleeve is supported by spaced bearings it is always effectively held in alignment, and the projecting portions to which the hose is attached may be given plenty of stock to withstand the strains placed on the joint even with a passage through the joint equal to that of the standard hose coupling with which it is used. Thus for example in a standard half-inch hose coupling a full half-inch passage may be used through the sleeve, which is not possible with the old types of construction, thus increasing the capacity of the joint for any standard coupling without increasing the size of the parts.

Having thus set forth the nature of my invention, what I claim is:

In a swivel joint of the character described, a sleevelike body having a longitudinal passage therein and an internal shoulder adjacent one end thereof, a sleeve in said passage having an end portion projecting from the latter end of the body and provided with means for connecting a hose thereto, an external flange on said sleeve cooperating with said shoulder to prevent axial movement, the inner end portion of said sleeve being of reduced outer diameter from that of the outer end portion of the sleeve on the other side of the flange sufficiently to give room for a packing and to provide for use of a body of conventional size for the size of hose used, a packing embracing the reduced portion of the sleeve, a follower for the packing embracing the inner end portion of the sleeve to form a supporting bearing for this end of the sleeve, and means for connecting a hose to the body at the opposite end from said first connecting means.

LEEMAN F. STROUT.